April 6, 1954 L. B. ARGUIMBAU ET AL 2,674,690

FREQUENCY MODULATION RECEIVER

Filed Feb. 26, 1949 2 Sheets-Sheet 1

INVENTORS
Laurence B. Arguimbau
John Granlund
BY Kenway, Jenney, Witter & Hildreth
Attys.

INVENTORS
Lawrence B. Arguimbau
John Granlund
BY Kenway, Jenney, Witter & Hildreth
Attys.

Patented Apr. 6, 1954

2,674,690

UNITED STATES PATENT OFFICE 2,674,690

FREQUENCY MODULATION RECEIVER

Lawrence B. Arguimbau, Cambridge, Mass., and John Granlund, New York, N. Y., assignors, by mesne assignments, to Research Corporation, New York, N. Y., a corporation of New York Application February 26, 1949, Serial No. 78,566

1 Claim. (Cl. 250—20)

Figure 1:
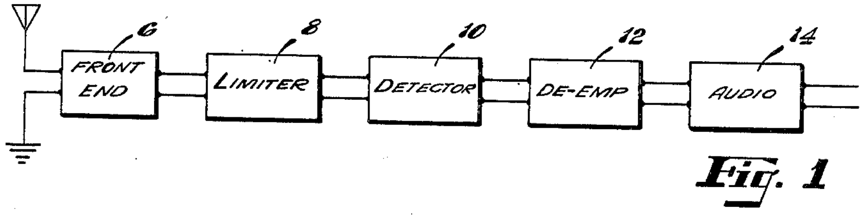

The present invention relates to radio signaling and is more particularly concerned with a frequency-modulation receiver arranged to eliminate or reduce the effects of interference, such as that due to transmission over common or adjacent channels, or to multi-path transmission.

It is well known that radio signals received over long distances are subject to distortion and fading because of multi-path transmission. Multi-path distortion and fading are essentially due to the interference between two or more signals arriving from the same transmitter by paths differing in time delay and efficiency. "Common channel" interference arises from the presence of signals of nearly equal strength on the same, or nearly the same, carrier frequency.

The object of the present invention is to provide a receiver in which the undesirable effects of interference are substantially reduced.

With this object in view the principal feature of the invention comprises a frequency-modulation receiver which is responsive at any time to only the strongest incoming signal. Under what may be termed favorable conditions, that is, when one signal is much stronger than all other signals, any frequency-modulation receiver will favor the strongest signal, and interference effects are not manifested. This is due to the so-called "capture" effect whereby a signal of sufficient strength is capable of completely suppressing an undesired signal even though the undesired signal is on the same carrier frequency. In general it may be stated roughly that this condition exists when one signal is at least two or three times as strong as the other.

Under unfavorable conditions, however, namely, when the relative signal strengths are in a ratio more nearly equal to one, the capture effect is not sufficient in the ordinary frequency-modulation receiver to cause suppression of the weaker signal. For signal strength ratios in the range of, say, one-half to two, serious interference between signals is possible. Since in multi-path transmission the signals transmitted on the different paths tend to vary widely in strength, there will be frequent "cross-overs" or interchanges; in other words, the receiver will first operate with a signal transmitted over one path, then with a signal transmitted over another path, etc., the rate of cross-over depending on the rate at which the signal strengths increase and decrease. It will be seen therefore that the times at which distortion can occur are those at which one signal fails to dominate or suppress a weaker signal, that is, at those times at which the signal transmitted over one path is less than two or three times as strong as the interfering signal or signals. Since the signal strengths may shift back and forth depending on atmospheric and other conditions, the range in which one signal is unable to take over complete control in existing receivers may not be adequate to afford satisfactory reception.

According to the present invention, the range within which the capture effect fails is greatly reduced. This is illustrated by the following example: Let $a$ represent the ratio of signal strength of the weaker signal to the stronger signal on the assumption that only two signals exist at the same carrier frequency. The quantity $a$ may vary between 0 and 1. (It is unnecessary to consider values of $a$ greater than 1 because $a$ is defined as the ratio of the weaker to the stronger signal.) The ordinary frequency modulation receiver may be considered as effective for values of $a$ between 0 and ⅓ or perhaps even ½. According to the present invention, the capture phenomenon is extended to cover the range from 0 to nearly 1. While it may be impossible to avoid the undesirable effects of common-channel interference or multi-path transmission when the signals are exactly equal in strength, the ratio may be extended to values of $a$ equal to 0.95 or even greater. This then diminishes the time and possibility of interference to such intervals as those in which the two signals are very close to the same strengths. In the case of multi-path transmission, the shifting signal strengths will cause the cross-over to occur sufficiently rapidly so that the distortion will be inappreciable.

The receiver of the present invention involves the use of circuits in which the instantaneous detected output varies in a substantially linear manner with frequency over a very wide range of frequencies and is substantially independent of amplitude. In addition, as the subsequent analysis will show it is essential to impose rather rigid requirements on the linear portions of the circuit to prevent a cross-over or interchange of signals during the audio cycle. The construction of the receiver and the conditions to be met therein will be more fully described in the specific description of the preferred form of receiver.

Figure 2:
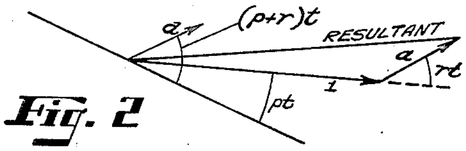
Figure 4:
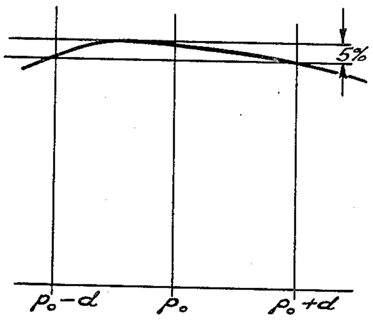
Figures 3, 5:
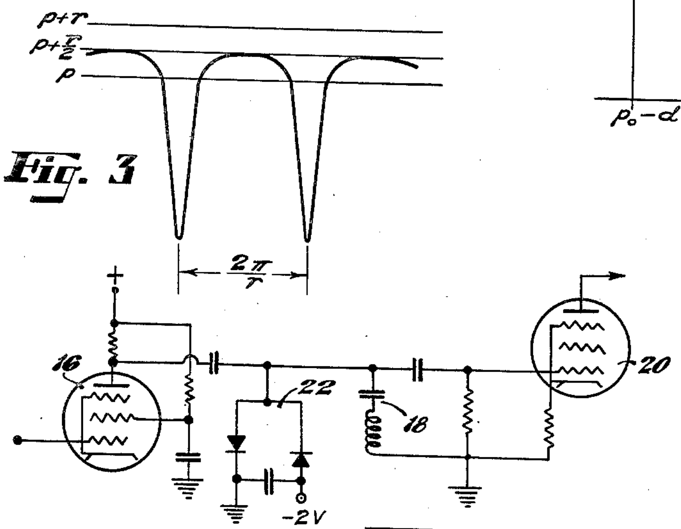

In the accompanying drawings, Fig. 1 is a block diagram of a complete receiver according to the present invention; Figs. 2, 3 and 4 are diagrams illustrating principles of the invention; Fig. 5 is a diagram of a limiter stage; Fig.

Figure 7:
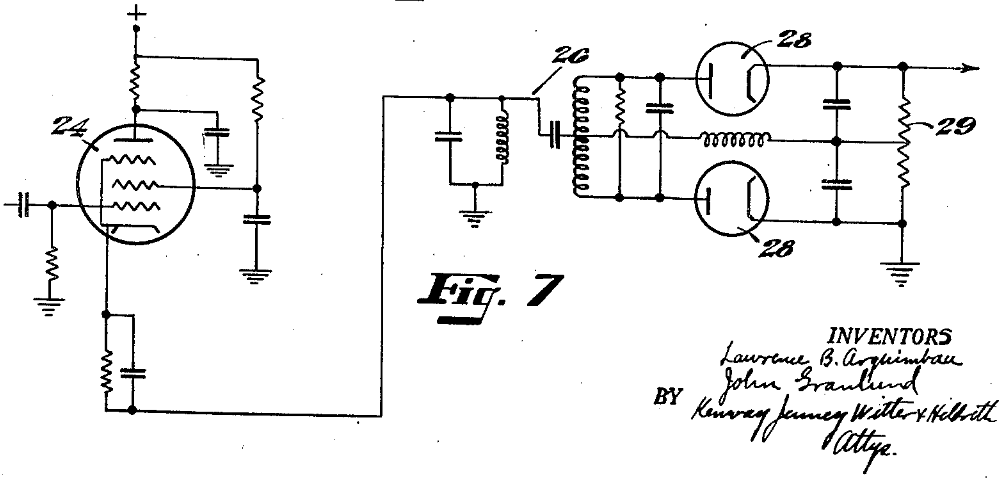
Figure 8:
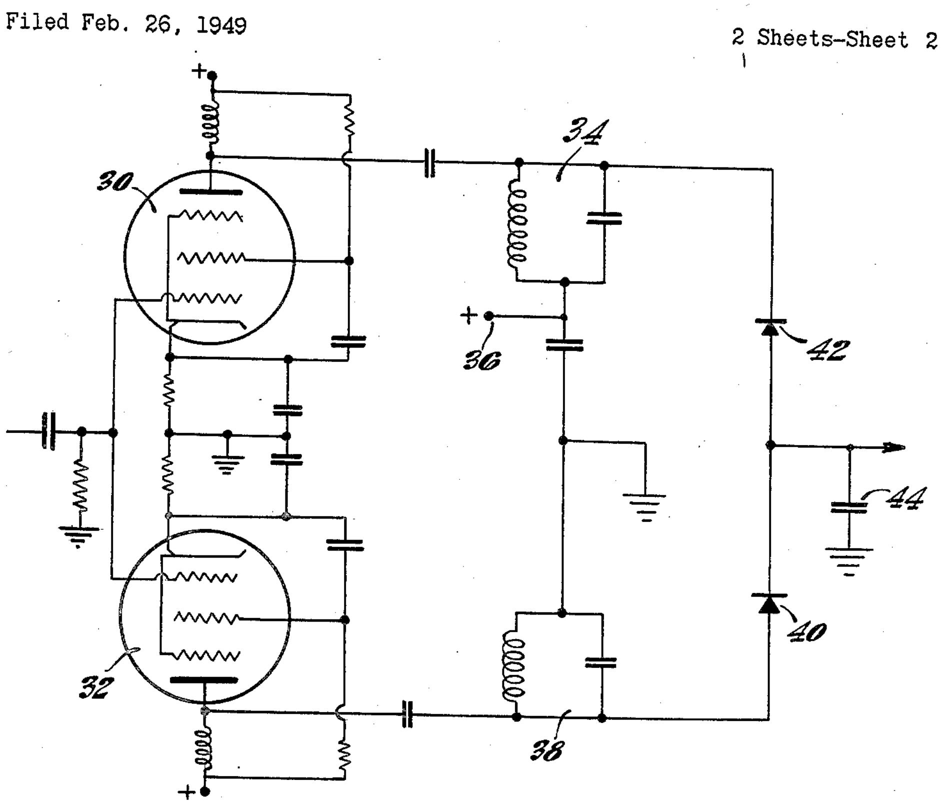
Figure 9:
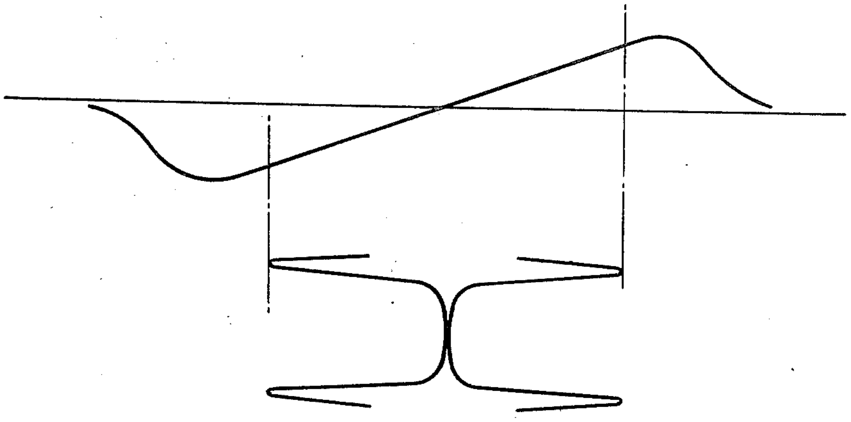

6 is a graph illustrating the limiter action; Fig. 7 is a diagram of the detector; Fig. 8 is a diagram of a modified, and in some respects preferable, detector; and Fig. 9 is a diagram illustrating the operation of the receiver.

The preferred form of receiver according to the present invention is illustrated in block diagram form in Fig. 1 and comprises what may be termed a "front end" 6 connected with the antenna and leading to a limiter 8 which in turn leads to a detector 10, a deemphasizer 12 and a suitable audio system 14. The front end comprises any desired stages of radio frequency amplification, mixing or heterodyning circuits, together with as many stages of intermediate frequency amplification as may be used with a substantially linear response. The essential characteristic of the front end portion 6 is that no substantial non-linearities are there introduced and that the frequency characteristic is essentially flat (within a very small tolerance) as will be hereinafter described.

The limiter 8 includes suitable limiting devices, preferably arranged in a plurality of stages, and having exceptional broad-band characteristics as will hereinafter be described. The detector 10 may be a discriminator of the Foster-Seeley or similar type, or preferably it may be a ratio detector of special form. The limiter-detector combination must be such as to give a detected output at all times linearly proportional to the instantaneous frequency deviation and independent of amplitude over an exceptionally wide frequency range. The deemphasizer and audio portions of the circuit may be of conventional form.

The principles of the present invention are described in connection with Figs. 2 and 3. Let us consider the case of multi-path transmission, wherein a dominant signal having an instantaneous frequency $p$ and an interfering signal arrive at the receiver over paths having different time delays. Since the signals are frequency-modulated, the latter will have a different instantaneous frequency, designated $p+r$. The variation of instantaneous frequency occasioned by the superposition of the two waves may be analyzed by reference to the vector diagram of Fig. 2, wherein the instantaneous phases of the two signals from some suitable reference are designated by $pt$ and $(p+r)t$ respectively. The phase of the resultant is readily determined from the diagram and the frequency of the resultant is given by differentiating the phase. It is readily shown that the frequency of the resultant is $$\omega=p+r\frac{a^2+a\cos rt}{1+a^2+a^2\cos rt}$$

The diagram is a simplified representation of conditions existing when a signal of strength 1, which may be termed the dominant signal is subjected to interference with a weaker delayed signal of strength $a$ arriving at the same time.

The above equation shows that when $a$ is very small the resultant frequency reduces to $$\omega=p+ar\cos rt$$

or in other words, the resultant frequency has the average frequency $p$ and the frequency deviation $ar\cos rt$. If one signal predominates to such an extent that $a$ is always less than about ½, the conventional frequency-modulation receiver is sufficient to suppress the unwanted signal. However, under multi-path conditions such predominance cannot be depended upon, and the fact that the signal strengths increase and diminish under varying circumstances causes an interchange or cross-over from one signal to the other. In the neighborhood where $a$ is nearly equal to 1, the distortion effect becomes apparent.

When $a$ is nearly equal to 1 the following conditions exist: Except when the two signals are nearly 180° out of phase with each other, the phase of the resultant is very nearly the average of the phases of the two signals. Thus the frequency of the resultant is almost always $$p+\frac{r}{2}$$

On the other hand the phase of the resultant never gains or loses a cumulative total of more than $$\frac{\pi}{2}$$

with respect to the strongest signal. This is seen from Fig. 3 wherein $a$ is only slightly less than 1 and the resultant is nearly but not quite 90° from the dominant frequency. The condition shown in Fig. 3 represents the time at which the most rapid change of phase occurs, namely when the phase of the resultant swings rapidly from $$\frac{\pi}{2}\text{ to }\frac{-\pi}{2}$$

Since the resultant does not execute a complete revolution around the end of the vector representing the dominant signal, its average frequency is exactly the frequency of the stronger signal. In other words, the results of this analysis may be summarized as follows:

The average frequency of the resultant is equal to the average frequency of the stronger signal but the instantaneous frequency of the resultant is almost always equal to $$p+\frac{r}{2}$$

These apparently contradictory statements are reconciled only by virtue of the fact that the resultant undergoes a very rapid change of frequency under the conditions shown in Fig. 3. Thus although the frequency of the resultant is nearly $$p+\frac{r}{2}$$

during most of the cycle, it undergoes a very rapid change over a small portion of the cycle sufficient to make the average exactly $p$ for the full cycle. A graph showing the excursion of instantaneous frequency caused by interference between two sine waves of nearly equal amplitude is given in Fig. 3. This represents a ratio of $a$=0.95.

Since the limiter considered as an ideal limiter, produces a square wave whose zero crossings are given by the diagram of Fig. 3, the wave has a fundamental frequency component $p$ and it has side bands separated in frequency by $r$ and extending at least over the full range covered by the frequency excursion in Fig. 3. In order to reproduce this signal therefore, the limiter, the discriminator and the amplifiers following the limiter must be able to pass at least the full frequency range from the mean carrier frequency to the frequency represented by the bottom of the spike. If they do this the voltage output from the discriminator averaged over several radio-frequency cycles corresponds to the frequency $p$. If the full frequency range is not passed, this average voltage output will be influenced by the presence of the interfering signal.

The band of frequencies covered by the frequency spikes of Fig. 3 for the case of sinusoidal modulation may be easily determined. Since the spike height is proportional to the instantaneous difference frequency $r$ between the two signals the largest spike height expected occurs when the two signals are instantaneously at opposite ends of the band. If the mean carrier frequency is $p_o$ and the maximum frequency deviation is $d$, the spikes reach a minimum frequency of $$p_o - d\frac{1+a}{1-a}$$

It is also necessary to account for the condition in which the instantaneous stronger signal is at a frequency of $p+r$, and the weaker signal at frequency $p$, which gives rise to a diagram like Fig. 3 except that the spikes go to a height of $$p_o + d\frac{1+a}{1-a}$$

Hence the system should be linear over a total band width of about $$2d\frac{1+a}{1-a}$$

For the standard 75 kc. deviation and $a=0.95$ all of the limiter circuits and the circuits following the limiter should be capable of passing a band width of about 6 mc.

The requirements for the front end of the system are less rigid in some respects and more rigid in other respects than for the limiter and subsequent circuits. It is only sufficient that the first stages have a sufficient band width to pass the transmitted signal. Under such circumstances they will also transmit the delayed replicas of any signals transmitted over other space paths since the front end is composed of an essentially linear amplifier. The wide spectrum corresponding to Fig. 3 does not exist in the front end, because it arises only at points where amplitude non-linearities exist. It is, however, essential that the front end have a sufficiently flat characteristic so that the relative strengths of signals arriving over different paths are not interchanged or crossed over during the audio cycle. This is illustrated by Fig. 4 showing a desired frequency characteristic for the carrier frequency $p_o$ and the side bands represented by the frequency deviation of $d$. (Here, for simplicity of explanation, it is assumed that the audio frequency is low in comparison to the frequency deviation $d$.) The value of $a$ having been determined, the characteristic is preferably flat within $(1-a):1$ over the full range of the deviation frequency. For example if $a$ is 0.95, the front end should be flat within about 5% between $p_o-d$ and $p_o+d$. If the frequency characteristic deviates from true flatness by exactly 5% there will be a possibility of a cross-over during each audio cycle, whenever the signal strengths are within 5% of each other. Such rapid cross-overs are a source of severe distortion, but since distortion is likely to occur in any event for $a$ between 0.95 and 1, by reason of the chosen design, this additional distortion is not serious. However, if the front end characteristic deviates from flatness by substantially more than 5%, the rapid audio-frequency cross-overs may occur for values of $a<0.95$, and hence may introduce a distortion additional to that caused by the mere presence of the interfering waves. It will be understood that the distortion due to cross-overs at audio frequency depends not only on the relative strengths of the interfering waves, but also on the composition of the side-bands; hence this form of distortion will be diminished whenever the modulation covers less than the full range. It will be understood that absolute flatness would be desirable, but that the foregoing criterion may be accepted as an engineering compromise, whereby both the front end and the limiter portions of the circuit are constructed so that they have nearly equal performance characteristics in respect to distortion in the presence of interfering signals.

The flat characteristic of the front end may be obtained by methods known to those skilled in this art; thus the so-called Butterworth frequency characteristic is considered desirable.

Figure 6:
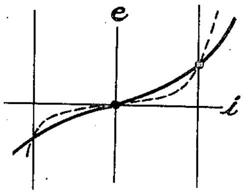

The limiter 8 preferably comprises several stages, one of which is shown in Fig. 5. The stage comprises an amplifier 16 to which the output from the front end unit is applied. The output of the amplifier is passed to a suitable intermediate frequency resonant circuit 18 and to an amplifier 20 which leads to a subsequent stage. Connected across the output of the tube 16 is a crystal limiter doublet 22, preferably of the general type described in the Cheatham application, Serial No. 17,153 filed March 26, 1948. The doublet 22 comprises two germanium crystals arranged front-to-back. Preferably a bias voltage is connected to one of the crystals and a condenser is connected to prevent forward conduction under the bias voltage. The characteristic of a single limiter stage is illustrated in Fig. 6. For several such stages the characteristic is as indicated in dotted lines whereby the output is substantially independent of the input. The crystal arrangement which is fully described in the Cheatham application and need not be further described here, provides resistance loading for increased voltages. Thus near the output end of the limiter the loading imposed by the crystals is such that the resonant circuit 18 is very broad. By this means the limiter 8 will pass several megacycles and hence the conditions defined above for the passage of the spike frequencies may be satisfied.

In the earlier stages of the limiter, when a weak signal is being received, it is possible that the crystals may not be driven to a sufficiently high voltage to cause the resonant circuit to be broad-banded to the extent specified. In that case, however, the crystals have no substantial limiting action and hence may be considered as suitably linear devices. Under such circumstances the first stages of the amplifier may be considered merely as an extension of the front end system 6 which is required to be flat only in the excursions represented by the frequency deviation. It is only after the first non-linearity introduced by the first effective limiting stage that the broad-banding effect is necessarily called into play to the extent of passing frequencies far in excess of the frequency deviation.

The detector 10 to which the output of the limiter is passed is shown in Fig. 7 as a cathode-driven Foster-Seeley type of discriminator, having an amplifier tube 24, and a coupled circuit 26 leading to the diodes 28. The output across the resistor 29 is fed to the de-emphasizer 12 in the usual manner. The parameters of the circuit are such that the discriminator characteristic is essentially linear over the wide band of frequencies heretofore mentioned, namely, about 6 mc. for the particular example given. This is in distinction to the range of about 200 kc. for the usual discriminator.

The characteristic is shown in Fig. 9. It should be emphasized that this linear characteristic is not only for the discriminator alone, but for the entire limiter and detector combination, or more generally, for that part of the system in which amplitude variations are reduced, as distinguished from the essentially linear front end portion of the system. The characteristic of Fig. 9 gives an instantaneous detected output that varies with frequency in a substantially linear manner over the full frequency excursions represented by the spikes of Fig. 3. One cycle of Fig. 3 for both directions of the frequency excursions is represented in Fig. 9.

A modified form of detector is shown in Fig. 8. It has two amplifiers 30 and 32 connected in the same phase to the limiter output. The output of one amplifier 30 is connected to a tank circuit 34 having a positive bias introduced at 36, while the amplifier 32 has its output connected to a tank circuit 38. Two rectifiers 40 and 42, which may be crystals or diodes, are connected between the tank circuits in the same sense as in the so-called ratio detector. An output condenser 44 is connected to the junction of the rectifiers. The voltage across 44 undergoes an excursion at audio frequency.

The tank circuits are tuned to widely separated frequencies represented by the peaks of the curve of Fig. 9. It can be shown that the curve is substantially linear over a very wide range. Furthermore, the circuit of Fig. 8 has an important advantage over Fig. 7 in that its characteristics allow it to accommodate itself to rapid changes of frequency. This can be seen by comparison with Fig. 7.

The output circuit of the discriminator of Fig. 7 has a discharge time constant determined by the value of the resistor 29. The time constant for charging, however, is less because of other portions of the circuit that are in parallel with 29 during charging. Because of this fact that the discharge time constant is long, the output circuit may not be able to follow the extremely rapid frequency excursions represented by Fig. 3, and some "diagonal clipping" may result. On the other hand, the output circuit of Fig. 8 can be shown to have a short time constant for discharge, whereby the circuit is enabled to follow the very rapid changes represented by the large frequency excursions of Fig. 3.

The instantaneous output voltage is the result of a balance between the charge transferred to the condenser 44 from one tank circuit and the charge transferred from the condenser to the other tank circuit. The circuit of Fig. 8 is adaptable not only to the system herein described, but to any amplitude-insensitive system in which exceptionally wide frequency ranges are handled, as for example in frequency-modulated television.

Since the circuit of Fig. 8 has a limiting action, whereby amplitude variations are reduced, one or more stages or all of the so-called limiter portion 8 of the system may be eliminated.

Other forms of limiter and detector combinations, such as interlocked oscillators, may be used, provided that the criteria heretofore mentioned are substantially satisfied, namely, a detected output varying linearly with frequency over a wide range in those parts of the system in which non-linear amplitude variations occur, and preferably also, a sufficiently rapid response characteristic to accommodate the rapid frequency excursions.

Although the invention has been specifically described in connection with multipath transmission problem, it will be seen that in its broader aspects it is concerned with the reduction of any "common-channel" interference, whether from the same or different stations. This is accomplished by the extension of the "capture" range from about ⅓ or ½ to as nearly unity as is desired. While specific embodiments of the invention have been shown and described, the invention is not limited thereto, but other apparatus and equipment may be used to satisfy the criteria herein set forth.

Having thus described the invention, we claim:

A frequency modulation receiver for distinguishing between signals having a ratio of signal strengths less than $a$, where $a$ is the ratio of the signal strengths only slightly less than unity, comprising a front end section having a frequency response adequate to reproduce the frequency deviated signals and substantially flat within $(1-a):1$ over the full range of the frequency deviation and substantally not passing frequencies beyond the range of modulated signals, and a frequency detector coupled to the front end section which is non-linear in amplitude but in which the instantaneous detected output varies in a substantially linear manner with frequency over a bandwidth at least $$2\frac{1+a}{1-a}$$

times the maximum frequency deviation, whereby said detector passes excursions of instantaneous resultant frequency due to superposition of signals of nearly equal strengths.

References Cited in the file of this patent

UNITED STATES PATENTS

| Number | Name | Date |
|---|---|---|
| 2,312,070 | Bliss | Feb. 23, 1943 |
| 2,341,937 | Maynard | Feb. 15, 1944 |
| 2,369,621 | Travis | Feb. 13, 1945 |
| 2,420,268 | Sontheimer | May 6, 1947 |
| 2,429,762 | Koch | Oct. 28, 1947 |
| 2,498,253 | Curtis et al. | Feb. 21, 1950 |

OTHER REFERENCES

Roder: Effects of Tuned Circuits Upon a Frequency Modulated Signal; Proc. IRE, vol. 25, No. 12, December 1937, pp. 1617–1647.

Wheeler: Common Channel Interference Between Two Frequency Modulated Signals—Proc. IRE, vol. 30, No. 1, January 1942, pp. 34–50.

Corrington: Frequency Modulation Distortion Caused by Common-and-Adjacent-Channel Interference; RCA Review, vol. 7, No. 4, December 1946, pp. 522–560.